Jan. 24, 1956 A. J. WESH 2,732,331
LIQUID HYDROCARBON CONVERSION METHOD AND APPARATUS
Filed Aug. 2, 1951 3 Sheets-Sheet 3
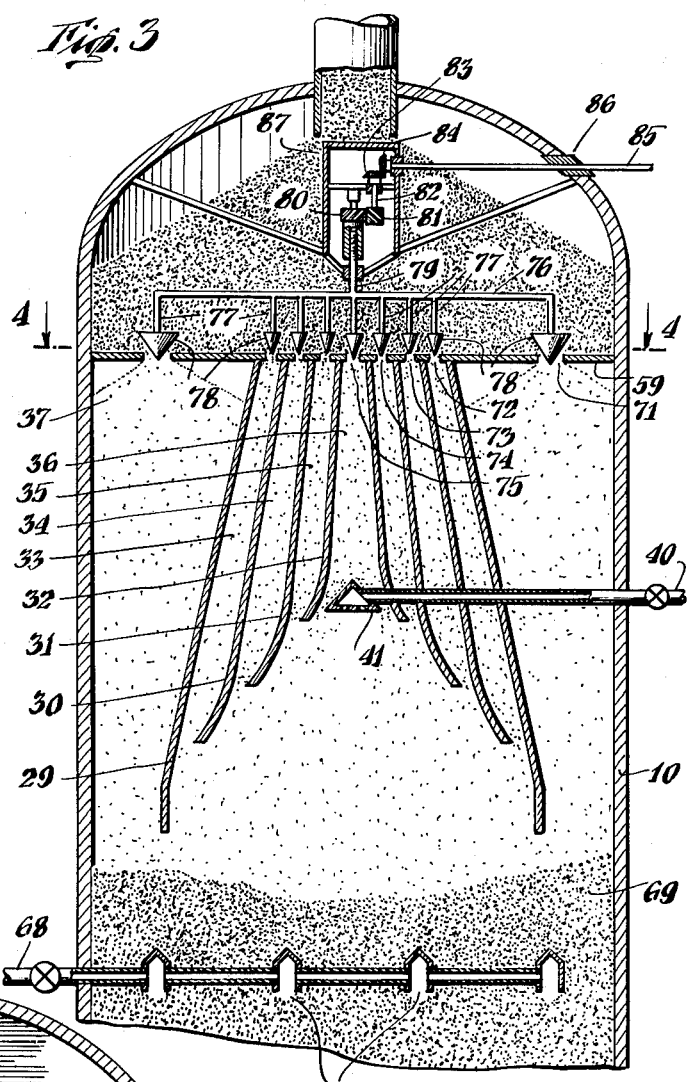
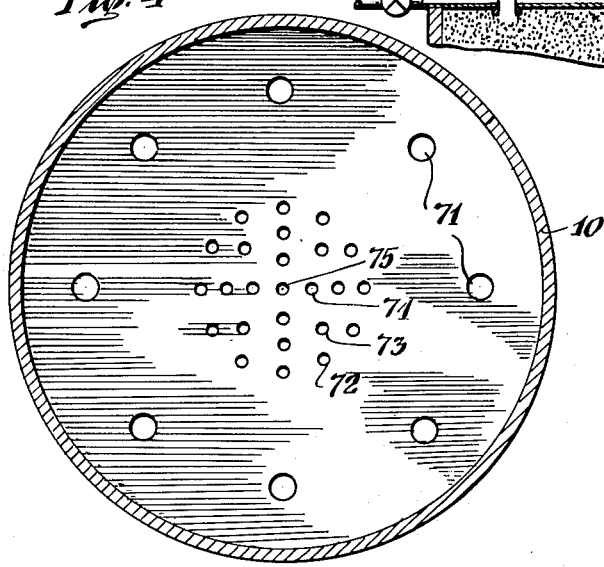
INVENTOR.
Anthony J. Wesh
BY
John A. Crowley Jr.
ATTORNEY

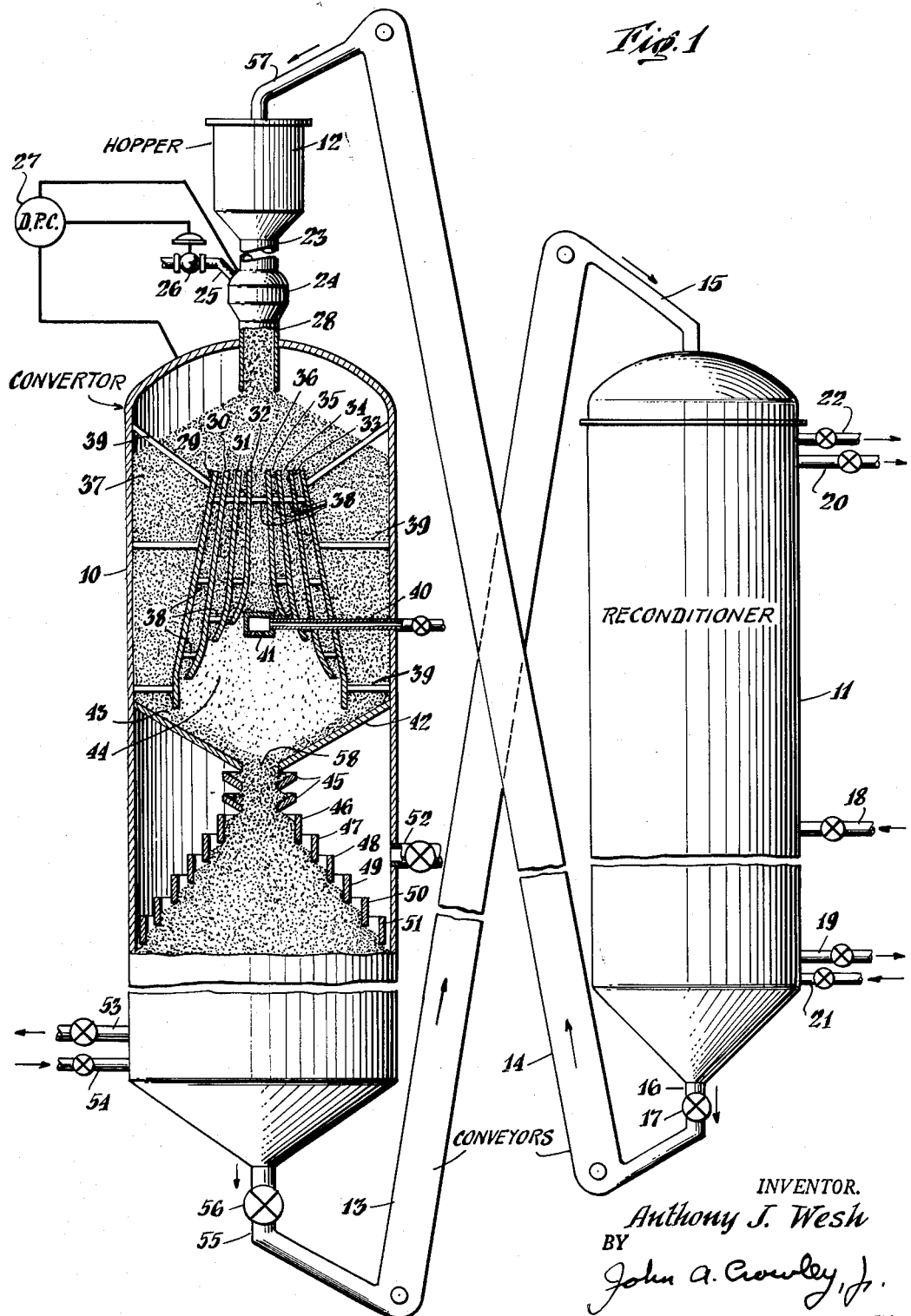

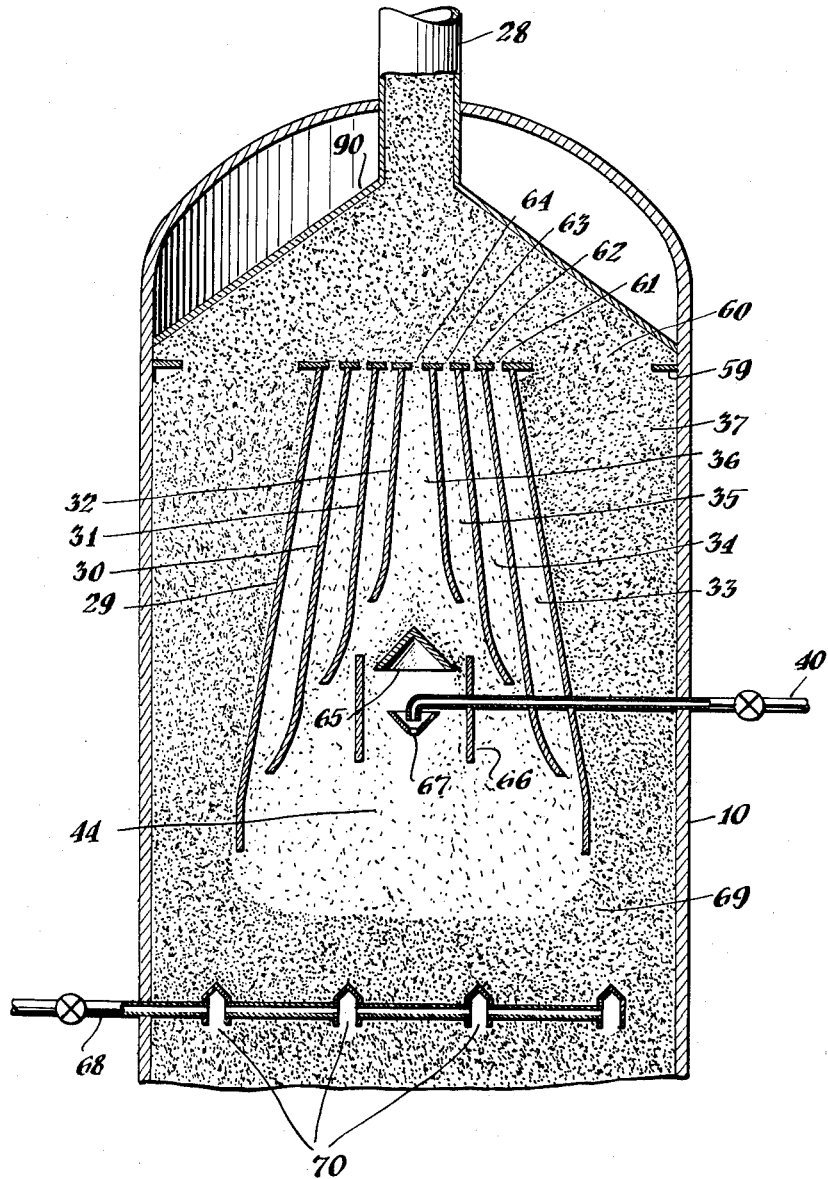

United States Patent Office 2,732,331
Patented Jan. 24, 1956

2,732,331

LIQUID HYDROCARBON CONVERSION METHOD AND APPARATUS

Anthony J. Wesh, Woodbury, N. J., assignor to Socony Mobil Oil Company, Inc., a corporation of New York Application August 2, 1951, Serial No. 239,890

9 Claims. (Cl. 196—52)

This invention has to do with a method and apparatus for the conversion of liquid or mixed phase hydrocarbons to lower boiling hydrocarbons in the presence of a moving granular contact mass material which may or may not exhibit catalytic properties with respect to the conversion reaction. It is particularly concerned with conversion processes wherein the contact material passes cyclically through a conversion zone wherein it flows as a substantially compact stream while being contacted with hydrocarbons to effect their conversion, and through a regeneration or reconditioning zone wherein it is contacted with a suitable gas to recondition it for reuse in the conversion zone. Typical of such processes is the catalytic conversion of high boiling liquid hydrocarbon charge to lower boiling gasoline containing gaseous products by contacting the liquid charge at temperatures of the order of 850° F. and upwards with a granular adsorbent catalytic material. Other exemplary processes are the thermal cracking, coking or visbreaking of a liquid or mixed phase hydrocarbon charge by contact with heated granular inert contact material.

Contact material which is catalytic in nature may partake of the nature of natural or treated clays, bauxite, activated alumina or synthetic associations of silica, alumina, or silica and alumina, to which other substances, such as certain metallic oxides, may be added in small amounts for specific purposes. Contact material which is inert in character may partake of the form of refractory materials, such as zirkite, corhart or mullite, or it may partake of the form of stones or metallic particles or balls. In any case, it is desirable to maintain the contact material particles within the size range about 3 to 100 mesh and preferably within the range about 4 to 20 mesh by Tyler Standard Screen Analysis.

In introducing liquid hydrocarbons to the conversion zone in processes of the above-mentioned types, it is necessary that the liquid hydrocarbons be charged in such a manner that the liquid is uniformly distributed across the horizontal cross-section of the contact material column within the conversion zone. If this is not done, very uneven conversion will take place, with a portion of the charge being over-converted and the remainder under-converted. To achieve this uniform distribution, it is usual to spray the liquid charge into the conversion zone. Where this spray is used, however, liquid particles frequently contact exposed hot metal parts within the upper section of the conversion zone and undergo a very rapid conversion which deposits coke on the hot metal parts. These coke deposits build up and break off from the metal parts in large pieces which plug up the restricted passages for solid flow within the lower section of the conversion vessel and elsewhere in the cyclic system.

This invention describes a system of introducing liquid hydrocarbon charge to a conversion zone in which a screen of catalyst is maintained between any metal parts and the liquid spray and in which all metal surfaces upon which liquid hydrocarbons might deposit coke are scrubbed with a falling contact material stream to remove such deposits before they build up.

A major object of this invention is the provision, in a process for the conversion of high boiling fluid hydrocarbons in the presence of moving compact mass of granular contact material, of a method and apparatus for supplying contact material granules and fluid hydrocarbons to the contact material mass, which method and apparatus overcome the above-described difficulties.

Another object is the provision, in a continuous cyclic process for the conversion of high boiling liquid or mixed phase hydrocarbons by means of granular contact material, of an improved method and apparatus for hydrocarbon and contact material introduction into the conversion chamber.

These and other objects of this invention will become apparent from the following discussion of the invention.

Before proceeding with this discussion, certain terms used in describing and claiming this invention will be defined. The term "granular" is used herein to apply to pelleted, tableted or spherical pieces or pieces of regular or irregular shape. The term "annular" is used herein to apply not only to ring-like spaces or structures of circular cross-sectional shape but also to apply to those spaces or structures which are in the form of triangular, rectangular or other symmetrical bands.

The discussion of the invention will most easily be understood by reference to the attached drawings, of which:

Figure 1 is an elevational view, partially in section, of a continuous cyclic system employing this invention;

Figure 2 is an elevational view, partially in section, of the upper section of a conversion vessel employing a modified form of this invention;

Figure 3 is an elevational view, partially in section, of the upper section of a conversion vessel employing a second modification of this invention; and Figure 4 is a sectional view taken along line 4—4 of Figure 3.

All of these drawings are highly diagrammatic in form.

Turning first to Figure 1, there is shown a conversion vessel 10 and a reconditioner 11 placed side by side. A supply hopper 12 is fixed above vessel 10 and conveyors 13 and 14 are provided to transfer contact material from converter 10 to reconditioner 11 and from reconditioner 11 to supply hopper 12. The specific reconditioner shown in Figure 1 is a regenerator adapted to regenerate contaminant-bearing catalyst granules. It is equipped with a catalyst inlet 15 and a catalyst outlet 16 bearing flow control valve 17. A gas inlet 18 is provided at the center of the regenerator, and gas outlets 19 and 20 are provided at the upper and lower ends. Heat transfer tubes (not shown) are provided within the regenerator. A suitable cooling medium is supplied to these tubes through conduit 21 and removed from the tubes through conduit 22. It will be understood that the form of reconditioner shown is the preferred form, but that the invention is not to be considered limited to the form shown. For some operations, for example, those wherein the contact material is inert in character, vessel 12 may broadly take the form of a heater adapted to heat the inert material to a temperature which will support the desired hydrocarbon conversion.

Turning now to hopper 12, it will be seen that a gravity feed leg 23 extends downwardly from the hopper to a seal chamber 24. This seal chamber is provided with a conduit 25 and diaphragm valve 26 through which an inert gas such as steam or flue gas may be admitted. Valve 26 is operated by differential pressure controller 27 so that an inert gas pressure is maintained within chamber 24 above the gaseous pressure within the upper section of chamber 10. Seal chamber 24 is connected to vessel 10 by means of conduit 28. Fixed within the upper end of housing 10 below conduit 28 are a plurality of concentrically arranged, symmetrical, upwardly tapered baffles 29, 30, 31, and 32. These baffles are of successively increasing cross-sectional areas and terminate at successively lower levels within the conversion chamber, the lowermost terminating of the baffles being nearest the walls of housing 10. All of the baffles have a common axis of symmetry. Passageways 33, 34, 35, and 36 are defined by the walls of baffles 29, 30, 31, and 32, said passageways terminating at successively lower levels. An annular passageway 37 is defined between the outer wall of the baffle 29 and the inner wall of vessel 10. Each of baffles 30, 31, and 32 flare outwardly toward the baffle terminating next below so as to provide flow restrictions at the lower end of passageways 33, 34, and 35, and to direct the flow of contact material from each of these passageways against the lower portion of the baffle terminating next below. Baffles 29, 30, 31, and 32 are held together by means of rods 38 and are fixed within vessel 10 by rods 39. A liquid hydrocarbon charge conduit 40 extends into vessel 10 and terminates within the lower end of passageway 36. Fixed to the end of conduit 40 within chamber 10 is spray nozzle 41. Conduit 40 and nozzle 41 are so situated that nozzle 41 acts as a restriction to contact material from passageway 36 and serves to divert the flow of contact material from passageway 36 over the lower portion of baffle 32. An inwardly sloping transverse partition 42 in the shape of an inverted frustum of a cone extends across chamber 10 beneath the lowermost terminating of the baffles, baffle 29, so as to form an annular passageway 43 between the lower end of baffle 29 and partition 42. A passageway 58 is provided at the center of partition 42 for contact material flow. Partition 42 should be at an angle with the horizontal which is greater than the angle of repose of the contact material so that contact material will pass downwardly over the partition. Vertically spaced apart inclined baffles 45 are provided beneath partition 42 and passageway 58. These baffles have openings at their centers in alignment with opening 58 and are spaced so close together that contact material will not flow from these openings to the outer edge of the baffles. A plurality of concentric baffles 46, 47, 48, 49, 50, and 51 are provided along the surface of the compact column maintained within vessel 10. These baffles extend to successively lower levels within the conversion chamber, the lowermost terminating baffle 51 being closest to the walls of vessel 10, while the lower end of the uppermost terminating baffle 46 is below the lowest of baffles 45. The lower ends of baffles 46, 47, 48, 49, 50, and 51 all lie in the same plane which makes an angle with the horizontal greater than the angle of repose of the contact material. A vaporized hydrocarbon charge conduit 52 extends into chamber 10 at a level above the surface of the compact column and beneath partition 42. The lower end of convertor 10 is provided with a conduit 53 for the removal of the gaseous products from the convertor. The term "gaseous" is used herein to denote a material existing in the gaseous phase at the particular conditions of temperature and pressure involved regardless of what may be the phase of that material under ordinary atmospheric conditions. The gaseous products withdrawn at 53 may be disengaged from the contact material column by any of a number of suitable arrangements, such as those shown in Simpson et al., U. S. Patent No. 2,336,041; Barstow et al., U. S. Patent No. 1,852,227; or Fahnestock, U. S. Patent No. 2,362,621. Also, suitable baffles may be proivded within the lower end of convertor 10 adapted to provide for uniform withdrawal of contact material from all sections of the horizontal cross-section of the conversion zone. Such baffles are shown in Evans et al., U. S. Patent No. 2,412,136. Conduit 54 is provided near the bottom of the convertor for the admission of inert purge gas. Convertor 54 terminates in a contact material withdrawal conduit 55 with control valve 56 thereon.

In operation, used contact material enters reconditioner 11 through conduit 15. Contact material granules gravitate through the reconditioner as a substantially compact column at a rate controlled by valve 17. When the reconditioner is a catalyst regenerator, as is shown in Figure 1, a combustion supporting gas is introduced into the regeneration zone within regenerator 11 through conduit 18. Carbonaceous contaminants are burned from the contact material by means of this gas and the products of combustion are removed through conduits 19 and 20. The temperature of the contact material is maintained below the level at which the contact material might be permanently injured by means of cooling coils within the regenerator to which a suitable cooling fluid is fed by means of conduit 21. Cooling fluid is removed through conduit 22. Contact material is withdrawn from vessel 11 through conduit 16 and transported to conduit 57 by means of conveyor 14. Contact material passes from conduit 57 into hopper 12 from which it gravitates by means of gravity leg 23 into seal chamber 24. Seal gas is admitted to the seal chamber by means of conduit 25 and flows into the upper section of vessel 10 and acts to prevent hydrocarbons from flowing upwardly through passages 33, 34, 35, 36, and 37. Contact material gravitates together with seal gas from seal chamber 24 into the upper end of vessel 10 to an accumulation of contact material therein above passages 33, 34, 35, 36, and 37. This accumulation is maintained by means of the restrictions at the lower ends of these passages as shown in Figure 1, or by restrictions at their upper ends as described hereinbelow. A portion of the contact material in this accumulation gravitates downwardly through passage 37 along the walls of housing 10 onto partition 42. The passage 37 acts to keep a compact mass of contact material on partition 42 since flow through 37 is throttled only by the level of contact material on 42. Baffles 29, 30, 31, and 32 act together with the passageways between them to form a central gas space 44 of less lateral dimensions than vessel 10. The angle of repose of the contact material acts to keep this gas space free of compacted contact material. However, it should be noted that the compact mass of contact material within the vessel extends upwardly from pipe 56 through the vessel and passage 58, across partition 42 and up through passage 37.

Contact material granules in the accumulation in the upper section of vessel 10 which do not gravitate through passage 37 gravitate downwardly through central passage 36 and concentrically arranged passages 33, 34, and 35. The flow through these passages 33, 34, 35, and 36 should be within the range about 10 per cent to 70 per cent of the total downward flow of contact material, the remainder passing downwardly through 37. The restrictions at the ends of passages 33, 34, 35, and 36 maintain contact material particles within these passages as substantially compact streams. Liquid hydrocarbon feed is charged through conduit 40 and is sprayed downwardly into the gas space below passages 33, 34, 35, and 36 by means of spray nozzle 41. Contact material particles issuing from passage 33 are directed against the exposed surface of baffle 29 by means of the curved lower end of baffle 30 to screen this portion of baffle 29 from contact with the liquid spray and to scrub the surface free of any coke which might be formed on this exposed portion of baffle 29 before it can build up to any appreciable depth. A similar action is performed by contact material particles issuing from passage 34 on baffle 30, by particles issuing from passage 35 on baffle 31, and by particles issuing from passage 36 on baffle 32. Thus all of the solid surfaces which define gas space 44 are scrubbed by downwardly flowing contact material. Contact material granules, after contacting these solid surfaces, shower downwardly through gas space 44 onto partition 42 or into passage 58. Contact material gravitates as a substantially compact stream over partition 42 and into passage 58. A high boiling liquid hydrocarbon charge is sprayed downwardly through gas space 44 and into the contact material stream flowing over partition 42. The liquid charge passes over partition 42 with the contact material and becomes thoroughly mixed with said contact material. The liquid charge-contact material mixture then passes downwardly through passage 58 and is distributed uniformly across the surface of the contact material column maintained in the lower section of the conversion zone beneath baffles 46, 47, 48, 49, 50, and 51. These baffles act to prevent segregation of the contact material according to particle size. If they were not provided and the upper surface of the bed assumed the natural angle of repose of the contact material, a major portion of the larger granules would pass over the surface to the outer section of the column while most of the smaller granules would remain at the center of the column, passing downwardly through the larger granules. This would result in channeling of any vaporized hydrocarbons passing through the column since the pressure drop would be lower in the outer section. By forcing the upper surface of the column into an angle greater than the angle of repose of the contact material, the segregation is avoided since the larger granules cannot pass over the surface of the column but are forced into the column by means of baffles 46, 47, 48, 49, 50, and 51.

If desired, a vaporized hydrocarbon charge may be admitted to the conversion zone through conduit 52. Hydrocarbon charge passes downwardly together with the contact material column through convertor 10 and is converted to gaseous products which are withdrawn through conduit 53. An inert purge gas such as steam or flue gas is admitted to the convertor through conduit 54 to accomplish the stripping of hydrocarbon products from the outflowing used contact material. Used contact material is removed from the convertor through conduit 55 and is transported to the top of reconditioner 11 by means of conveyor 13 and conduit 15.

Figure 2 illustrates a second form of this invention as applied to the upper section of the conversion chamber, and like parts in Figures 1 and 2 bear the same numerals. In Figure 2, a confining cone 90 extends outwardly from conduit 28 to the walls of vessel 10. This cone is at an angle with the horizontal greater than the angle of repose of the contact material and functions, in the manner described in connection with baffles 46, 47, 48, 49, 50, and 51 of Figure 1, to prevent segregation of the contact material according to particle size. Transverse partition 59 extends across the upper section of the conversion zone within convertor 10 beneath cone 90. Partition 59 is provided with a series of annular passageways 60, 61, 62, and 63 having a common center which coincides with the center of partition 59. A central passage 64 is provided at the center of partition 59. Suitable support means (not shown) are provided to maintain partition 59 in position. Baffles 29, 30, 31, and 32 forming passageways 33, 34, 35, 36, and 37 terminating at successively lower levels, as described in connection with Figure 1, depend downwardly from partition 59 and are so arranged that passage 60 connects into passage 37, passage 61 connects into passage 33, passage 62 connects into passage 34, passage 63 connects into passage 35 and passage 64 connects into passage 36. The horizontal cross-sectional area of passageway 61 is such that it is less than the horizontal cross-sectional area of passageway 33 at any point along its length. Also the horizontal cross-sectional areas of passageways 62, 63, and 64 are less than the horizontal cross-sectional areas at any point within passageways 34, 35, and 36, respectively. Passageway 60 is of such a size that its horizontal cross-sectional area is greater than the horizontal cross-sectional area of the lower end of passageway 37. Positioned adjacent to the lower end of passageway 36 is a symmetrical, upwardly tapered baffle 65 terminating in an apex on the central axis of passageway 36. The baffle here shown is a cone but baffles of other shapes such as square or hexagonal may be used. An upright hollow cylindrical member 66 of inside diameter greater than the diameter of the base of baffle 65 is fixed concentrically about baffle 65. Liquid hydrocarbon inlet conduit 40 extends through the wall of converter 10 and terminates at the center of a horizontal cross-section of cylinder 66 below baffle 65. A downwardly directed spray nozzle 67 is fixed to conduit 40 at this termination point. An inlet conduit 68 for vaporized hydrocarbon charge extends through the wall of convertor 10 beneath the surface of contact material column 68 and horizontally across the convertor. Spaced along its length are vapor distributing members 70 in the shape of inverted angle roofed troughs.

In operation, contact material enters the conversion chamber through conduit 28 and passes downwardly through passages 60, 61, 62, 63, and 64 into passages 37, 33, 34, 35, and 36, respectively. Passages 61, 62, 63, and 64 act to throttle the flow of contact material granules into the respective passages therebelow so that contact material falls freely through passages 33, 34, 35, and 36. Contact material is discharged from each of said passages so that it will flow along the lower section of the solid baffle terminating next below and performs a scrubbing action similar to that described in connection with Figure 1. However, here the particles emerge from passages 33, 34, 35, and 36 at velocities higher than particles issue from these passages in the apparatus of Figure 1. The scrubbing action is therefore much more pronounced. Flow through passage 37 is throttled by the level of contact material column 69 so that gas space 44 is maintained free of compact contact material mass. Vaporized hydrocarbons may be introduced to the conversion zone through conduit 68 and distributors 70 and pass downwardly through the conversion zone with the liquid charge to undergo conversion to lower boiling gaseous products.

Figures 3 and 4 illustrate a third form of this invention, and like parts in Figures 1, 2, and 3 all bear the same numerals. In Figure 3, partition 59 extends transversely across the upper end of the conversion zone within chamber 10. Figure 4 is a sectional view along line 4—4 of Figure 3, showing the upper side of partition 59. Figures 3 and 4 are best considered together. An orifice 75 passes through the center of partition 59. Also, four sets of orifices 71, 72, 73, and 74 penetrate partition 59, the orifices in each set being equi-distant from the center of 59, while the orifices of different sets are different distances from the center of 59, orifices 71, 72, 73, and 74 being successively closer to the center of 59. Above partition 59 is a horizontal support member 76 from which depend vertical rods 77 centrally placed above each of the orifices of 71, 72, 73, 74, and 75. To these rods are attached solid plugs 78 in the shape of inverted cones, one plug being provided for each orifice in partition 59. Shaft 79 extends upwardly from 76 and has a helical gear 80 at its upper end. Helical gear 80 is in contact with a second helical gear 81 attached to the lower end of a shaft 82. At the upper end of this shaft is a bevel gear 83 in contact with a second bevel gear 84 at the end of a horizontal shaft 85. This shaft 85 passes through the wall of convertor 10 by means of stuffing box 86. Gears 80, 81, 83, and 84 are protected from catalyst particles by means of a housing 87 placed around said gears.

In operation, contact material granules flow through orifices 71, 72, 73, 74, and 75 at rates determined by the position of members 78. These granules fall freely through passages 37, 33, 34, 35, and 36, respectively, and remove any adhering coke from the solid surfaces with which they come in contact as described in connection with Figures 1 and 2. Liquid hydrocarbons are sprayed downwardly on the falling contact material granules by means of spray nozzle 41, and vaporized hydrocarbons may be introduced through conduit 68 and distributors 70. The surface level of contact material column 69 is maintained constant by adjusting the position of plugs 78 to vary the amount of contact material flowing through the orifices beneath these plugs. This may be done manually by means of a hand crank attached to shaft 85 or, preferably, automatically by a suitable mechanism such as that shown in U. S. Patent No. 2,458,162.

It should be understood that the conversion vessel may be of any desired horizontal cross-sectional shape such as circular, rectangular or hexagonal. Baffles 29, 30, 31 and 32 also may adopt any horizontal cross-sectional shape but it is preferable that baffles 29, 30, 31, and 32 be of the same cross-sectional shape as the convertor. However, within the broader scope of this invention, the convertor and baffles may differ in shape. The slope of baffle 42 should be maintained at an angle of the order of 40 degrees or greater with the horizontal but preferably not greater than 60 degrees.

As an example of the application of this invention, its use in the catalytic cracking conversion of high boiling fluid hydrocarbons may be considered. In such an operation, a granular catalyst is introduced into the convertor at a temperature within the range about 900° F. to 1200° F. depending upon the desired conversion temperature, the catalyst to oil ratio and the particular hydrocarbon charge involved, and the desired products. A liquid hydrocarbon charge which may consist principally of hydrocarbons boiling above the desired average conversion temperature is introduced through pipe 40. Such a charge may be a reduced petroleum crude which has been preheated to a temperature of the order of 600-800° F. A gas oil fraction which has been vaporized and heated to a temperature of the order of 800-950° F. may be introduced to the conversion zone through conduit 52. Gaseous products containing high yields of gasoline may be withdrawn from the convertor through conduit 53. The pressure in the conversion chamber may be controlled quite low, usually of the order of 5 to 30 pounds per square inch gauge. The relative ratio of liquid to gaseous charge may vary widely depending on the specific refinery stock conditions. The catalyst to oil ratio on the weight basis may be within the range about 2 to 20 parts of catalyst charged per part of oil.

This invention should be understood to cover all changes and modifications of the examples of the invention herein chosen for purposes of disclosure which do not constitute departures from the spirit and scope of this invention.

I claim:

1. A process for the conversion of high boiling liquid hydrocarbons to lower boiling hydrocarbons in the presence of a substantially compact, moving column of granular contact material which comprises: maintaining a substantially compact moving column of granular contact material within the lower section of a confined conversion zone, maintaining a gas space in the upper section of said conversion zone above said contact material column, removing contact material from the lower section of said column, passing contact material into said gas space by means of a plurality of passages laterally confined by solid surfaces terminating at successively lower levels within said gas space, discharging contact material from each passage over the confining surface of the passage which terminates next below whereby said surface will be scrubbed free of any coke formed thereon, passing the contact material so discharged to said compact column spraying a high boiling liquid hydrocarbon charge into the portion of said gas space lying beneath the uppermost of said passages, passing said liquid charge through said column to effect its conversion to lower boiling hydrocarbons and removing said lower boiling hydrocarbons from the conversion zone.

2. A method for the conversion of high boiling liquid hydrocarbons to lower boiling gaseous hydrocarbons in the presence of a substantially compact moving column of granular contact material which comprises: introducing granular contact material at a temperature suitable for the desired conversion into the upper section of a confined, elongated, substantially vertical conversion zone, passing at least a portion of the contact material so introduced downwardly as a plurality of concentrically arranged substantially compact streams laterally confined by solid surfaces and terminating at successively lower levels within said conversion zone, maintaining a substantially compact column of granular contact material within the lower section of said conversion zone with the upper surface of said column at a level near the lowermost terminating of said streams, discharging each of said streams at its termination point against the solid confining surface of the stream terminating next below it whereby said solid surfaces will be scrubbed free of any coke formed thereon, passing the contact material after said contact with said surfaces downwardly onto said column as a freely falling shower, spraying a high boiling liquid hydrocarbon charge into said shower, passing said charge downwardly through said column to effect the desired conversion to lower boiling gaseous products, removing said products from the conversion zone separately of the contact material and removing contact material from the lower section of said conversion zone.

3. A process for the conversion of high boiling liquid hydrocarbons to lower boiling gaseous hydrocarbons in the presence of a substantially compact moving column of granular contact material which process comprises: introducing contact material at a temperature suitable for the desired conversion into the upper section of a confined conversion zone, passing said contact material downwardly through a central passage, also passing said contact material through a plurality of concentrically arranged passages confined by solid surfaces about said central passage, the innermost of said concentrically arranged passages terminating a fixed distance below said central passage and the remainder of said concentrically arranged passages terminating at successively lower levels within the conversion zone so as to form a central gas space of less lateral dimensions than the conversion zone within the upper section of said conversion zone, directing the flow of contact material from each of said passages downwardly over that portion of the solid surface terminating next below the passage which faces the gas space whereby said solid surfaces will be scrubbed free of any coke deposits, showering the contact material after flowing over the solid surfaces downwardly onto a surface inclined toward the central section of the conversion zone, passing contact material over the inclined surface as a substantially compact stream, spraying a high boiling liquid hydrocarbon charge downwardly through said contact material shower toward said compact stream on said surface, passing the compact stream with liquid charge thereon from said inclined surface to a substantially compact column of granular contact material maintained therebelow, passing said liquid charge through said column to effect its conversion to lower boiling gaseous hydrocarbon products, removing said products from the conversion zone, and removing contact material from the lower section of the conversion zone.

4. A method for the conversion of high boiling hydrocarbons to lower boiling products in the presence of a substantially compact column of granular contact material which comprises: maintaining a substantially compact bed of granular contact material within the upper section of an enclosed housing, gravitating contact material from the lower section of said bed as a substantially compact annular stream along the walls of said housing onto a surface inclined toward the center of said vessel, passing contact material over said inclined surface as a substantially compact stream, passing contact material from the lower section of said bed through that portion of the housing surrounded by said annular stream as a plurality of concentrically arranged streams terminating at successively higher levels as they are successively further removed from said annular stream whereby a central gas space is provided above said inclined surface of less lateral dimensions than said bed, directing the contact material from each of said concentrically arranged streams onto the portion of the confining surface of the stream terminating next below which faces the gas space, showering contact material after contacting said confining surfaces through said gas space and onto said inclined surface, directing a spray of liquid hydrocarbon charge into said shower toward said inclined surface, maintaining a substantially compact column of contact material throughout the lower section of said housing below said inclined surface, passing contact material and liquid charge from said inclined surface through a passageway laterally confined by means of spaced apart obstructions onto the surface of said column, maintaining a plurality of spaced apart obstructions at a plurality of points across the upper surface of said column at successively higher levels as they are successively further removed from the wall of said housing, said obstructions lying in a plane at an angle with the horizontal greater than the angle of repose of said contact material, passing a vaporized hydrocarbon charge into the upper end of said column between said obstructions, passing hydrocarbon charge through said column to effect the conversion to lower boiling products, removing said products from said housing, supplying contact material at a temperature suitable for the desired conversion to the upper section of said bed and removing contact material from the lower section of said column.

5. An apparatus for the conversion of high boiling liquid hydrocarbons to lower boiling products in the presence of a substantially compact column of granular contact material which comprises in combination: means defining a conversion chamber adapted to confine a substantially compact column of granular contact material within its lower section, members defining a plurality of passageways for the flow of contact material fixed within the upper section of said chamber and terminating at successively lower levels below the upper end of said chamber and substantially above the lower end thereof, each of said passageways being so directed that it will flow contact material passing from the passageway over the lower portion of the confining member of the passageway terminating next below, means to supply contact material to the upper ends of said passageways, a liquid spray device horizontally situated so as to face said lower portions of the confining members of said passageways over which contact material flows and at a vertical level below the lower end of the one of said passageways terminating at the highest level and above the lower end of the passageway terminating at the lowest level, means for supplying liquid hydrocarbon charge to said spray device, means for removing lower boiling hydrocarbon products from said chamber and means for removing contact material from the lower section of said chamber.

6. An apparatus for the conversion of high boiling liquid hydrocarbons to lower boiling gaseous hydrocarbons in the presence of a substantially compact moving column of granular contact material which comprises in combination: means defining a conversion chamber adapted to confine a substantially compact column of granular contact material within its lower section, a plurality of upwardly tapered symmetrical baffles fixed concentrically one about the other within the upper section of the conversion chamber so as to define a plurality of passageways for contact material flow between said baffles, said baffles terminating at successively lower levels within the conversion zone and the lower end of each of said baffles being curved toward the baffle terminating next below it so as to provide a throttle on the contact material flow in the passageway next to said baffle and above said curved portion and so as to direct the flow of contact material from said passageway over the lower portion of the baffle terminating next below, means for maintaining the surface level of the contact material column below the lowermost terminating of said baffles, means to supply contact material to the upper end of said passageways, means for spraying a high boiling liquid hydrocarbon charge into said conversion chamber at a point above the lower end of the baffle terminating at the lowest level but below the lower end of the baffle terminating at the highest level, means for removing lower boiling hydrocarbon products from said conversion chamber and means for removing contact material from the lower section of said conversion chamber.

7. An apparatus for the conversion of a high boiling liquid hydrocarbon charge to lower boiling gaseous hydrocarbon products in the presence of a substantially compact moving column of granular contact material which comprises in combination: a confined, elongated conversion chamber adapted to confine a substantially compact column of granular contact material within its lower section, a conduit for the introduction of contact material extending into the upper section of said conversion chamber, a member defining a laterally confined central passageway for the flow of contact material fixed within said conversion chamber beneath said conduit, members defining a plurality of annular passageways for the flow of contact material concentrically aranged about said central passageway and terminating at successively lower levels beneath said central passageway, each of said central and annular passageways being adapted to flow contact material over the lower portion of the passageway terminating next below, means to throttle the flow of contact material to the upper end of said central and annular passageways so that contact material will flow through said passageways as freely falling streams, means for maintaining the upper surface of the contact material column below the lowermost terminating of said streams, a liquid spray device positioned below the discharge end of said central passageway and above the lowermost terminating of said annular passageways and facing the lower portions of said annular passageways over which contact material flows, means for supplying liquid hydrocarbon charge to said spray device, means to withdraw gaseous material from the lower section of said chamber and means for withdrawing contact material from the lower section of said chamber.

8. An apparatus for the conversion of high boiling liquid hydrocarbons to lower boiling gaseous hydrocarbons in the presence of a substantially compact moving column of granular contact material which comprises in combination: means defining a conversion chamber adapted to confine a substantially compact column of granular contact material within its lower section, a plurality of upwardly tapered symmetrical baffles fixed concentrically about one another within the upper section of the conversion chamber so as to form a plurality of passageways therebetween and terminating at successively lower levels within the conversion chamber, the lowermost terminating of said baffles being nearest the walls of said conversion chamber and the lower ends of all of said baffles except the lowestmost terminating being outwardly curved to direct contact material flowing between any one of said baffles and the baffle terminating next below over the lower portion of the baffle terminating next below, means for supplying contact material to the passageways between said baffles, a partition in the shape of an inverted frustum of a cone extending transversely across said conversion chamber beneath said lowermost terminating baffle and having an opening at its center, a liquid spray device fixed above said partition but below the uppermost terminating of said baffles, means for supplying liquid hydrocarbon charge to said spray device, a plurality of vertically spaced apart baffles fixed beneath said opening in said frusto-conical partition and having openings therethrough in alignment with the opening in said frustoconical partition, said baffles being spaced so close together that contact material will not flow from the passageway defined by said openings in said baffles to the outer edge of said baffles, a plurality of concentric baffles spaced across said conversion chamber at successively lower level, the lowermost terminating of said last-named baffles being closest to the walls of said conversion chamber while the lower end of the uppermost of said baffles lies below the lowermost of said vertically spaced apart baffles and the lower ends of all of said last-named baffles lie in a plane which is at an angle with the horizontal greater than the angle of repose of said contact material, means for removing contact material from the lower section of said conversion chamber and means for removing gaseous hydrocarbon products from the conversion chamber.

9. An apparatus for the conversion of liquid hydrocarbons to gaseous products in the presence of a substantially compact, moving column of granular contact material, which comprises in combination: members defining a conversion chamber adapted to confine said column of contact material in its lower section; a plurality of concentric upwardly tapered baffles within the upper section of the conversion chamber spaced apart so as to form a plurality of downwardly directed contact material passageways, said baffles terminating at successively lower levels within said chamber so that the lower portions of the baffles define a gas space while the upper sections of the baffles are situated within a portion of said chamber removed from said gas space, said baffles further having lower ends, each of which are curved toward the baffle terminating next below; means for maintaining the surface level of said column below the lowermost terminating of said baffles; means for spraying liquid hydrocarbon charge into said gas space; means for supplying contact material to the upper ends of said passageways between said baffles and means for removing gaseous products from the lower section of the conversion chamber.

References Cited in the file of this patent

UNITED STATES PATENTS

| | | |
|---|---|---|
| 2,488,493 | Evans | Nov. 15, 1949 |
| 2,492,998 | Lassiat | Jan. 3, 1950 |
| 2,526,701 | Shirk | Oct. 24, 1950 |
| 2,558,769 | McKinney | July 3, 1951 |
| 2,574,850 | Utterback et al. | Nov. 13, 1951 |